JOHN W. TRUBY

IMPROVED CORNER SOCKET for SHOWCASES and FRAMES.

No. 117831. Patented Aug 8 1871.

WITNESSES:
Lewis L Coburn
O.L. Coburn

INVENTOR:
John W. Truby

UNITED STATES PATENT OFFICE.

JOHN W. TRUBY, OF CHICAGO, ILLINOIS, ASSIGNOR TO MATTHIAS TERHUNE, OF SAME PLACE.

IMPROVEMENT IN CORNER-SOCKETS FOR SHOW-CASES, BOXES, &c.

Specification forming part of Letters Patent No. 117,831, dated August 8, 1871.

*To all whom it may concern:*

Be it known that I, JOHN W. TRUBY, of Chicago, in the county of Cook and State of Illinois, have invented a new and useful Improved Corner-Socket for Show-Cases, Boxes, and Frames of all kinds; and I do hereby declare the following to be a full, clear, and exact description of the same, reference being had to the accompanying drawing, and to the letters and figures marked thereon which form a part of this specification, and in which—

Figure 1:
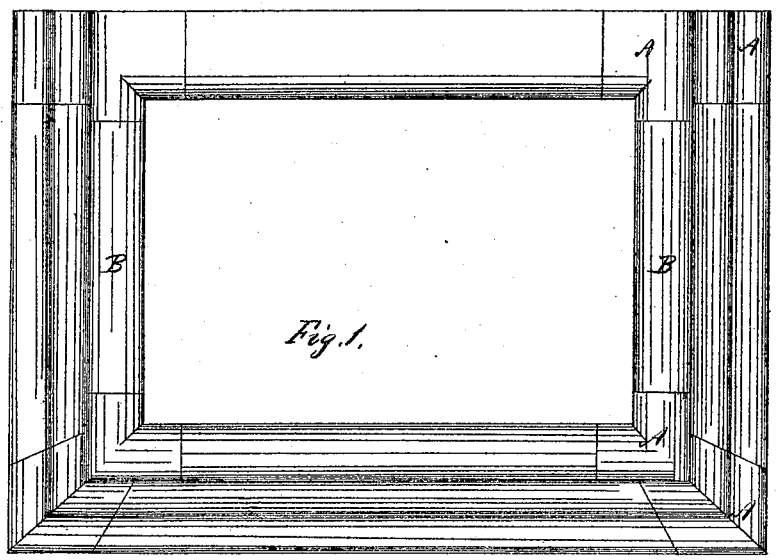
Figure 2:
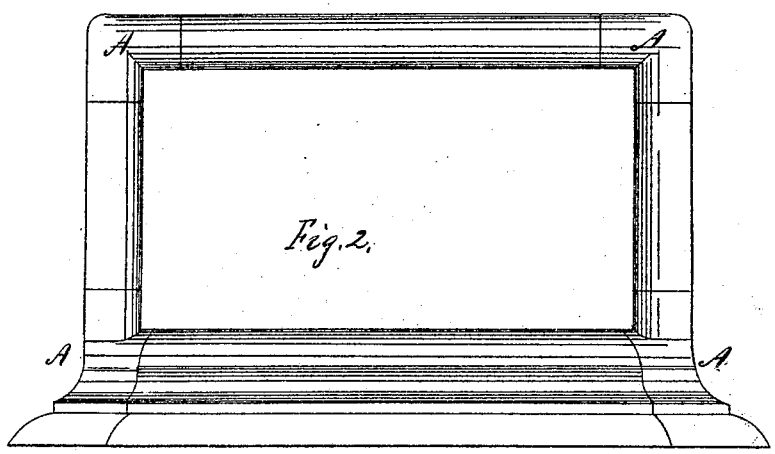
Figure 3:
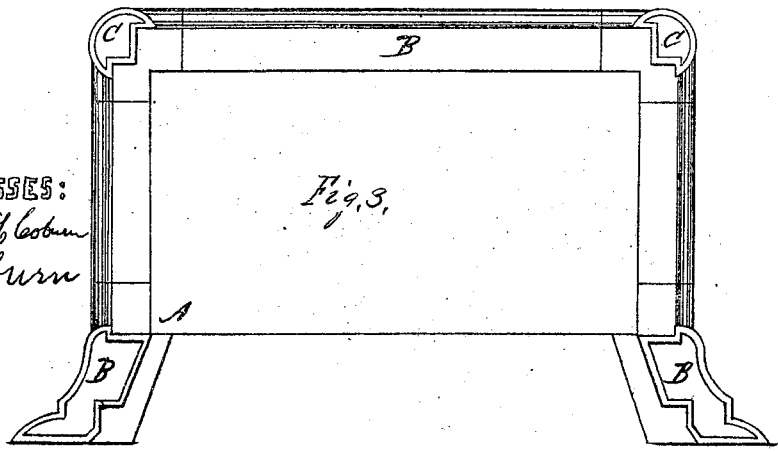

Figure 1 represents a top view of a show-case with my corner-sockets applied; Fig. 2, a side elevation of the same; and Fig. 3, a side elevation of one side of a show-case showing the corner-sockets thereon.

Show-cases and frames manufactured in the ordinary manner, by dovetailing, mortising, or gluing the corners together, are very liable to break apart, and furthermore, one of the main items in manufacturing show-cases and frames, is the labor in putting the pieces together at the corners.

To overcome these objections I make metallic corner-pieces or sockets A. The different pieces of the frame of the show-cases may be made of any desired shape, as in the annexed drawing. The base-pieces are not of the same shape as the uprights and the top pieces, and that part of the lower corner-socket which is intended for the lower molding of the show-cases is made of the same shape as the molding, as shown at B; also, the shape of the socket that receives the upper molding B of the show-case is shown at C. These corner-sockets are cast with projections to receive the moldings of the frame or show-cases, each projection being adapted to the shape of the molding it is desired to use for that part of the frame. The molding may then be got out in long strips and simply sawed to desirable lengths and the ends put in the corner-sockets, when the frame is completed.

These sockets make a nicely-finished corner that will always remain substantial and firm, and the frame cannot give in its joints so as to sag out of shape.

Having thus fully explained the nature and construction of my invention, what I claim, and desire to secure by Letters Patent, is—

The corner-sockets A, for show-cases, boxes, and frames, having cavities C molded to fit the molding which connects said sockets, as shown and described.

JOHN W. TRUBY.

Witnesses:
LEWIS L. COBURN,
J. L. COBURN.